3,543,388
CONTROLLED AREA EXPLOSIVE BONDING
George F. Blank and Billy A. Bothe, Concord, Calif., assignors to Hexcel Corporation, Dublin, Calif., a corporation of California
Filed Dec. 29, 1967, Ser. No. 694,643
Int. Cl. B23k 29/00
U.S. Cl. 29—486    3 Claims

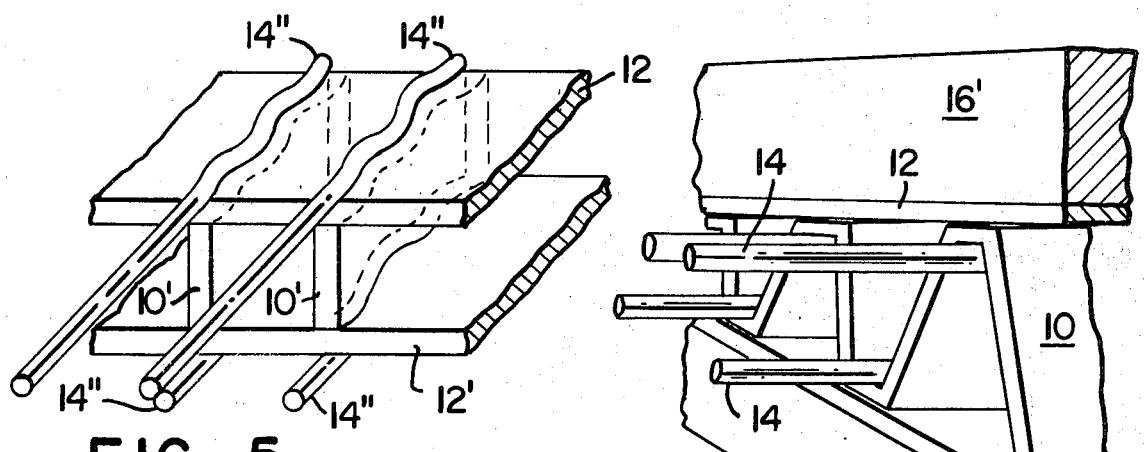
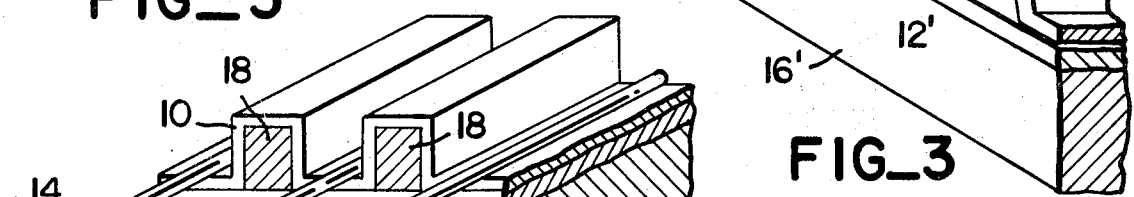
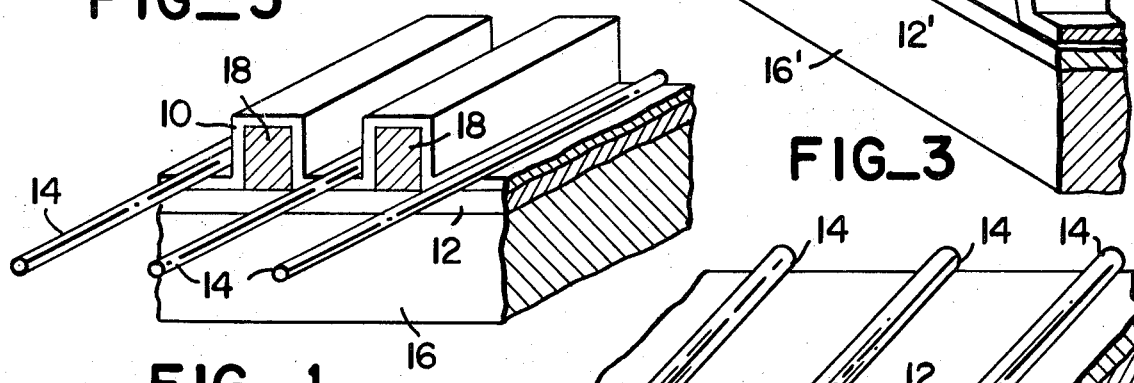
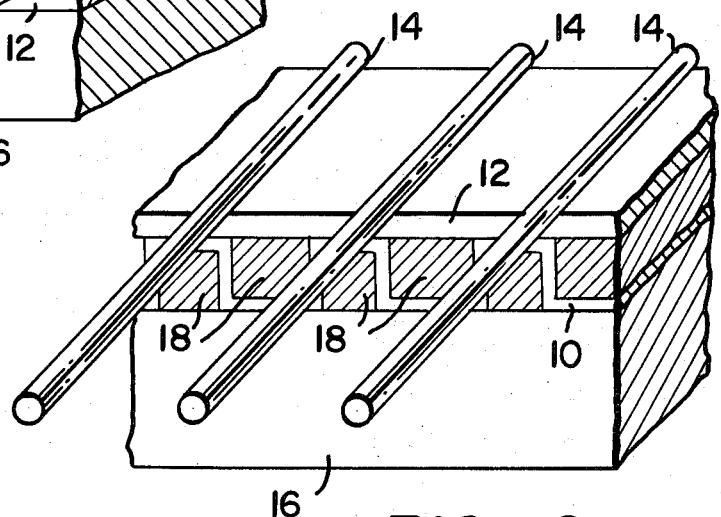
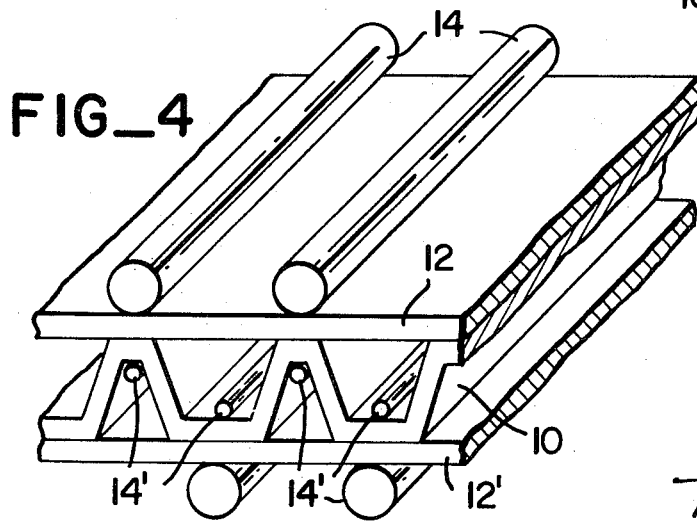

ABSTRACT OF THE DISCLOSURE

A method for manufacturing structures formed from a plurality of metal members through the bonding of the metal members along linear surface portions thereof by first shaping the members to correspond to segments of the structure, aligning and temporarily retaining the members to provide the required configuration, disposing an explosive charge at those outside surface areas of at least one member opposite those locations of adjacent members where the explosive bonding is to be accomplished and initiating the explosive charge.

---

This invention relates to the manufacture of metallic structures through the formation of explosively created bonds between adjacent metal members along relatively narrow surface areas thereof.

Metal forming has evolved through the use of many different procedures. For example, in conventional welding methods such as gas welding, arc welding, electric resistance welding and the like, high temperature heating operations are employed to bond metal members together. Although such methods are extensively employed, the prolonged high temperatures required to create the intermetallic bond tend to change the metallographic structure of the metal members, thereby seriously decreasing the mechanical and chemical properties of the resulting bonded members. As a result, a number of metals, particularly those having high melting temperatures such as the refractory metals, are not readily joined through the use of such bonding procedures. More recently, the use of an explosive charge to accelerate adjacent metal members into contact at a rate sufficient to produce intermetallic bonding has been developed. Such bonding methods are normally practiced at room temperature thereby making it feasible to bond metals heretofore considered to be difficult if not impossible to join by other conventional methods.

In operation, explosive bonding is produced by first separating the inside surfaces of the members to be bonded by a distance (gap) sufficient to allow for the aforementioned acceleration of the members at the critical velocity rate required to produce a bond therebetween; see, for example, U.S. Pat No. 3,301,746, issued May 1, 1962. Concurrently therewith, a layer of explosive is applied to an outside surface of an outer metal member. Upon detonation of the explosive charge, the outer member having the explosive layer thereon is accelerated at least the aforementioned velocity toward the adjacent stationary member, thereby producing the desired bond. Where only partial bonding is desired, a continuous layer of explosives is still employed. However, as disclosed in U.S. Pat. No. 3,301,746, spacers are positioned to eliminate the aforementioned gap at those predetermined areas where explosive acceleration and bonding is not required. In this manner, the spacers may also produce corrugations in the metallic member being accelerated. However, this procedure is not entirely satisfactory as the spacers do not always provide the ultimate structural configuration intended. As a result, substantial amounts of material is wasted in the formation of unsatisfactory structures.

It has now been found that irregular structural shapes can be formed by first mechanically corrugating or shaping parts (or segments) of the ultimate structure, i.e., the individual metallic members, to correspond to portions of the final structural configuration desired. The members are then aligned with the necessary spacing for accomplishing explosive bonding in the desired structural relationship. Thereafter, while maintaining the aforementioned spacing, an explosive charge is disposed along the outside surface of an outer member only at those isolated locations corresponding to where the impact bonding is ultimately desired, i.e., opposite those inside surface locations having the required spacing. In this manner, detonation of the linear-shaped explosive charge creates sufficient acceleration and impact only at those locations exhibiting the prescribed spacing. As a result, the amount of explosive charge required to accomplish the desired bonding is substantially reduced. More importantly, however, critical and difficult placement of corrugation-producing spacers is eliminated. Thus, the production of structural shapes having improperly corrugated metal members is substantially diminished. Broadly, the present invention is also directed to the formation of a linear-shaped bond between substantially flat metal members such as plates and the like.

Linear-shaped explosives, such as detonating fuse (or cord), have been utilized in the past to crimp overlapping pipe or cable sections; see, e.g., U.S. Pat. No. 2,367,206, issued Jan. 16, 1945 wherein "Primacord" was disclosed as being useful for making a tight connection between overlapping pipe members. There an annular-shaped strand of explosive was employed to provide a physical juncture between metal members that are coaxially aligned, i.e., not movable toward and away from each other along a path transverse to the general plane of the surfaces to be bonded. Although the instant invention is intended to include the explosive bonding of members having arcuate surfaces of up to a semi-circle, it is not intended that metallic members defining an arcuate surface greater than a semi-circle be included. Thus, the instant invention is not directed to physical distortion such as that disclosed in U.S. Pat. No. 2,367,206, supra, but to actual chemical bonding as produced by explosively generated acceleration and impact of adjacent metal members.

The present invention is especially advantageous when directed to the explosive bonding of refractory metals having melting points that make diffusion-type bonding operations impractical. Such metals include, among the many that could be enumerated, tungsten, molybdenum and tantalum. Of course, other metals such as titanium, aluminum and the like can also be bonded with the instant process. In addition, the bonding can be produced between both similar and dissimilar metal members.

In a preferred aspect, the linear explosive is arranged along the outside surfaces of two metal facing members in diametric opposition so that the respective explosive forces generated will compensate for each other, thereby eliminating the need for a back-up support.

The aforementioned aspects of this invention as well as other features and advantages thereof will become more apparent when reference is made to the following detailed disclosure, especially in view of the attached drawing, wherein:

FIGS. 1–5 are each perspective views of specific embodiments of this invention illustrating the various arrangements of linear explosive to provide particular configurations of chemical bond.

Referring now to the drawings wherein similar characters of reference represent corresponding parts in each of the several views, FIG. 1 includes corrugated panel member 10 disposed adjacent facing member 12 and separated therefrom by a distance sufficient to provide acceleration as required to form an explosive bond between members 10 and 12. The required amount of spacing can be provided by dimpling the surface of members 10 and 12 or in any other conventional manner known to those of skill in this art; see, e.g., U.S. Pat. No. 3,137,937, issued July 23, 1964. Members 10 and 12 can be temporarily retained in the desired configuration, e.g., through the use of doublebacked masking tape.

Strands 14 of linear detonating explosive such as conventional detonating fuse or cord are positioned along the outside surfaces of panel member 10 opposite those locations on the inside surface of members 10 and 12 where formation of the chemical bond is desired. Each of the strands 14 of linear detonating explosive is attached to a single initiator (not shown) for simultaneous detonation. Back-up member 16, of any conventional design suitable for maintaining a uniform resistance to the force of the explosive, is employed to support members 10 and 12 in their predetermined relationship. Shock resisting members 18, being formed of a suitable material that may be either metallic or non-metallic, are disposed between members 10 and 12 at those locations where no bonding is to occur. In this manner the corrugated configuration of member 10 will be buffered against the impact of the explosion. A protective film such as masking tape may be placed between strands 14 and panel member 10 to protect the metal surface from the direct impact of the explosion.

Turning now to FIG. 2, panel member 10 is disposed so as to be directly supported by back-up member 16. Facing member 12 is positioned over member 10 and spaced therefrom in a manner as previously set forth and known to one skilled in this art. A plurality of strands 14 of linear detonating explosive are disposed to provide the desired chemical bond. Again, internal supports 18 are provided to prevent unnecessary deformation of the corrugated member 10 as a result of the impact produced by the detonation of strands 14. Again it will be obvious to one skilled in this art as to the procedures and devices needed to simultaneously detonate all of strands 14.

In FIG. 3, an embodiment including a pair of facing members 12 and 12' is illustrated. In this embodiment, a pair of supporting members 14 and 14' are arranged in abutting contact with members 12 and 12', respectively. Strands 16 of linear detonating explosive are also disposed along corrugations in panel member 10 where bonding is desired with members 12 and 12'. Here again, the manner of separation of panel member 10 from members 12 and 12' to provide the desired bonding upon detonation of the explosive charge will be apparent to one skilled in this art. Upon the simultaneous detonation of the plurality of strands 16, panel member 10 is thus bonded to both facing members 12 and 12'.

Referring to FIG. 4, corrugated panel member 10 is arranged in the desired spatial relationship to outside facing panels 12 and 12'. Strands 14 of linear detonating explosive are disposed on the outside surface of both facing members 12 and 12' opposite those areas where bonding is desired. By employing a similar amount of explosive against each facing member 12 and 12', the subsequent simultaneous detonation of all the strands 14 will create equal and opposite reactions, thereby compensating for and negating the effect of each other. Thus, supporting members are not needed. To prevent the possible collapse of corrugated panel member 10, auxiliary strands 14' containing less explosive, or an explosive of lesser force, are disposed within the corrugations of panel member 10 to counteract or offset the internal stresses created on panel member 10.

Referring to FIG. 5, a series of panel members 10' having undulating corrugations are positioned between and substantially normal to facing members 12 and 12'. Here again, panel members 10' are spaced initially from facing members 12 and 12' as will be understood by those skilled in this art. Strands of detonating cord 14" are arranged on the outside surfaces of panels 12 and 12' in linear configuration with the cross section of members 10'. Thus, upon detonation of strands 14", the desired chemical bonding of members 10' to both 12 and 12' is accomplished.

The term "linear detonating explosive" as used herein is meant to include those materials such as detonating cord or fuse that are presently available in many commercial forms such as "Primacord" and the like. The term "linear portions" as used herein when referring to the configuration of the explosively created chemical bond is meant to describe a bond that is elongated, i.e., of narrow cross section. Such a bond can have a width to length ratio of at least 1:10 or greater. The detonation velocity of the linear detonating explosive should not exceed 120% of the sonic velocity of the metal in the structure with the highest sonic velocity. When the detonation velocity does exceed this amount, oblique shock waves often ensue that prevent formation of a strong metal-to-metal bond between the metal layers.

The following examples are illustrative of the various metals and procedures that may be employed with the method of the present invention. The examples are intended to be illustrative only and not considered as exhaustive or limiting of the scope of this invention.

EXAMPLE I

A 5 x 8 inch sheet of an alloy formed from aluminum and copper (2025–T3) and having a thickness of 0.025 inch was mechanically corrugated to provide a panel member corresponding to member 10 of FIG. 2 of the drawing. A flat facing member of a similar alloy was provided to be bonded to the corrugated member. The surfaces to be bonded were degreased with acetone. The corrugated member was placed on a steel supporting plate. Rectangular steel bars, substantially conforming to the height of the corrugations in the corrugated member, were placed within the corrugated members to provid mechanical support. Tape having a width of 1/8 inch and a thickness of 0.006 inch was attached to the flat facing member along the two edges thereof transverse to the direction of the corrugations in the corrugated member. This tape thickness was found to provide sufficient standoff between the aluminum alloy members to enable explosive bonding to occur. The upper surface of the facing member was covered with double-backed masking tape for maintaining the detonating cord as intended as well as protecting the upper surface of the facing member from chemical damage. Strands of "Primacord" having a loading of 15 grains per linear foot were disposed along the masking tape on the facing member at those locations opposite from where explosive bonding was desired. The strands were attached together for simultaneous detonation and detonated. The steel bars were removed, the double-backed masking tape peeled off, and the edges of the irregular structure trimmed to remove the stand-off tape. The resulting structure exhibited both the desired structural configuration as well as the necessary bonding.

EXAMPLE II

In a manner similar to the procedure set forth in Example I above, two flat sheets of an alloy formed from aluminum and copper (2024–T3) and having a thickness of 0.050 inch were arranged with a series of spaced-apart corrugated members also having a thickness of 0.050 inch and extending between the sheets in a manner corresponding to FIG. 5 of the drawing. Strands of "Primacord" having a loading of 15 grains per linear foot were disposed along the surfaces of the sheets at those areas corresponding to and opposite the locations occupied by the corrugated members. Again the plurality of strands were simultaneously detonated. The resulting assembly exhibited both the desired pre-arranged structural configuration and possessed the required bonding strength at those locations corresponding to the placement of "Primacord." The assembly required no additional support during the detonation.

While two embodiments of the invention have been shown and described, it will be apparent that other adaptations and modifications can be made without departing from the true spirit and scope of the invention.

What is claimed is:

1. A method for explosively bonding at least two metal members along linear portions of adjacent surface areas thereof to provide a composite metal structure of irregular configuration comprising the steps of: shaping at least one of said members to include non-coplanar surface areas bonding said linear portions; arranging and temporarily maintaining said metal members so that the linear portions of said at least one member are coextensive with surface areas of other of said metal members, said coextensive surfaces being separated by a space sufficient to provide for the acceleration necessary to produce explosive bonding; disposing a first linear explosive charge along the surfaces of at least one member opposite said coextensive surfaces, said charge being sufficient to produce a chemical bond between said members only at said coextensive surfaces; disposing a second linear explosive charge of lesser force than said first charge on the opposite side of the linear portions of said at least one member and simultaneously detonating said first and second charges to produce said explosive bonding between said coextensive surfaces.

2. The method in accordance with claim 1 where said members are movable toward and away from each other along a path transverse to the general plane of the surfaces to be bonded.

3. The method in accordance with claim 1 wherein said members comprise refractory metals.

References Cited

UNITED STATES PATENTS

| | | | |
|---|---|---|---|
| 3,327,382 | 6/1967 | Keeleric | 29—455 X |
| 3,345,735 | 10/1967 | Nicholls | 29—455 X |
| 3,419,951 | 4/1969 | Carlson | 29—423 X |
| 3,427,706 | 2/1969 | Jaffee | 29—423 X |
| 3,447,231 | 6/1969 | Jaffee | 29—423 |
| 3,449,819 | 6/1969 | Blank | 29—421 X |
| 3,264,731 | 8/1966 | Chudzik | 29—486 |
| 3,417,455 | 12/1968 | Pearson | 29—470 X |

JOHN F. CAMPBELL, Primary Examiner

R. J. SHORE, Assistant Examiner

U.S. Cl. X.R.

29—421, 423, 470.1, 497.5